Nov. 4, 1930.  R. L. LITTLE  1,780,712
FLEXIBLE COUPLING
Filed April 27, 1927
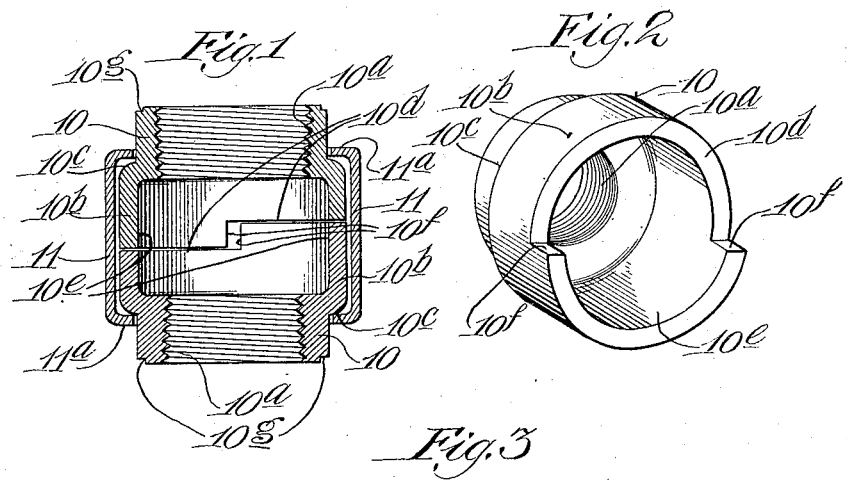
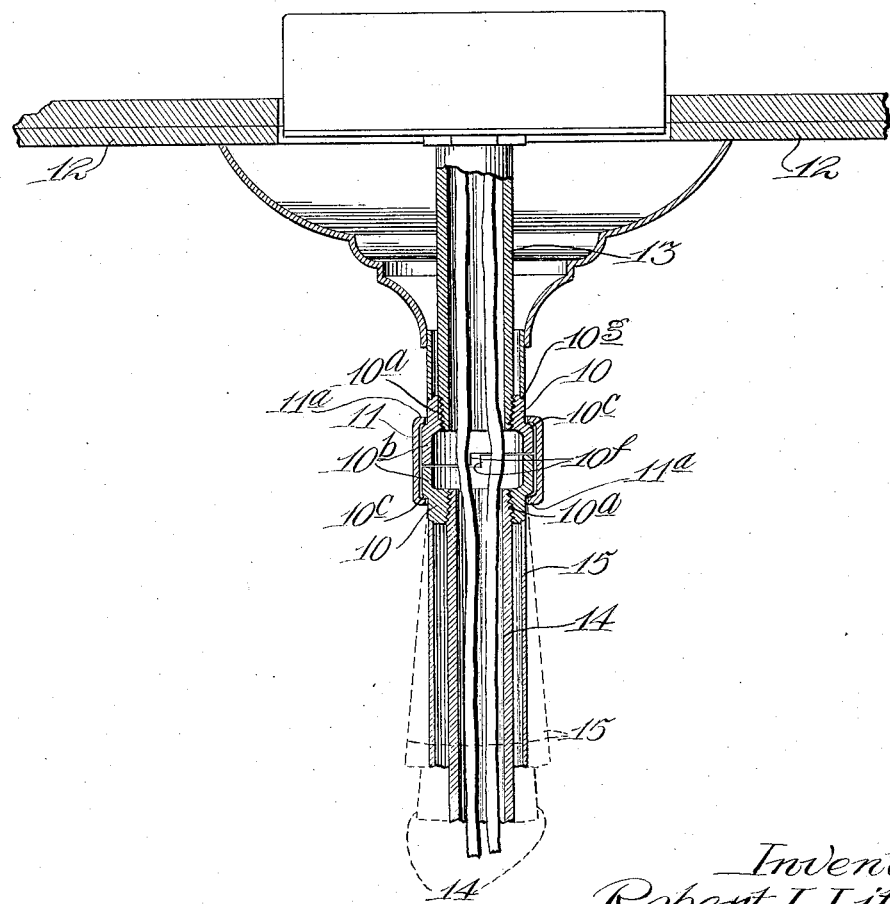
Inventor:
Robert L. Little
By Dyrenforth, Lee, Chritton & Wiles,
Attys.

Patented Nov. 4, 1930

1,780,712

UNITED STATES PATENT OFFICE

ROBERT L. LITTLE, OF CHICAGO, ILLINOIS, ASSIGNOR TO LINDSAY LIGHT COMPANY, OF CHICAGO, ILLINOIS, A CORPORATION OF ILLINOIS

FLEXIBLE COUPLING

Application filed April 27, 1927. Serial No. 187,017.

This invention relates to improvements in flexible couplings, and more especially to such a coupling particularly adapted for mounting or supporting electrical fixtures, devices, appliances and the like.

One of the features of my invention is the provision of such a coupling that will give sufficient flexibility so that the fixture or other electrical appliance, if supported from the ceiling, for example, may always hang vertically, even though the stud or nipple, carrying the same, is out of line from the vertical.

One of the features of my coupling, also, is to provide a device of that kind that will completely house and protect the electric wires carried therein, thus completely guarding the same against damage. Besides protecting the wires, the coupling furnishes a free and unobstructed passage therethrough for said wires, so that they are not damaged by any parts of the coupling itself, that is, there is a free and unobstructed wire-way through my improved coupling.

My improved coupling is strong and durable and has substantially the same strength as if it were made integral instead of in separate pieces.

By the use of my invention, a vertical mounting for an electrical fixture may be obtained without the use of the old and objectionable S-hook; and without the use of a universal joint or coupling with a horizontal bar or rod across the same, such as has been used heretofore. In these old devices with such a cross rod or bar, the same frequently lay in contact with the wires and damaged the same.

Other features and advantages of my invention will appear more fully as I proceed with my specification.

In that form of device embodying the features of my invention, Fig. 1 is a vertical sectional view, Fig. 2 is a view in perspective of the members forming a part of the coupling, and Fig. 3 is a vertical sectional view showing the method of mounting a fixture from the ceiling with my improved coupling.

As shown in the drawings, the coupling comprises the two tubular members 10, 10. The outer ends of these members are internally threaded as indicated by $10^a$ and their inner ends are enlarged as indicated by $10^b$ to form the shoulders $10^c$.

The enlarged end of each of the members 10 is cut away through substantially 180 degrees as indicated by $10^d$ so that there will be formed a projection $10^e$ extending through substantially 180 degrees and terminated by the shoulders $10^f$, $10^f$.

11 indicates a tubular casing adapted to enclose the enlarged ends $10^b$ of the tubular members after they are in co-operative relation with the projections $10^e$ engaging each other, each one lying in the recess $10^d$ of the other. The edges of the casing 11 are turned inwardly to form flanges $11^a$ to engage the shoulders $10^c$ of the tubular members to hold the two members together.

It is to be particularly noted, that the flanges $11^a$ of the tubular casing 11 do not meet the shoulders $10^c$ tightly and that there is also some space between such flanges and the smaller ends of the tubular members 10. In other words, all the parts are loosely assembled so that considerable relative movement between the tubular members 10, 10 is permitted. That is, the casing 11 holds the members 10, 10 so loosely that either one may be moved considerably out of axial alignment with the other. The engagement of the shoulders $10^f$ of each of the members with the corresponding shoulders of the other members prevent rotation of each of the members relatively to the other.

In Fig. 3 a conventional mounting is indicated. As here shown, 12 indicates a ceiling, 13 a stud, nipple or piece of pipe projecting from the ceiling or conduit box and adapted to support the fixture. This stud is ordinarily rigidly mounted and may be somewhat out of the vertical. 14 indicates the pipe adapted to support a fixture (not shown) on its lower end. The pipe 14 is joined to the stud 13 by my improved coupling and it will be seen that even though the stud 13 is not vertical, the coupling will permit the requisite movement of the pipe 14 out of alignment with the stud 13 to make the former hang vertically.

The extreme ends of the members 10 may be provided with slight recesses 10$^g$ adapted to receive the end of an outer casing 15 surrounding the pipe 14.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible in view of the prior art.

What I claim as new, and desire to secure by Letters Patent, is:

A coupling of the character described, comprising two tubular members having their outer ends provided with threads and their inner ends enlarged to form shoulders, a supporting casing holding the tubular members together, said casing surrounding the enlarged ends and provided with inwardly projecting flanges at its inner ends to engage the shoulders, the internal diameter of the flanges at the ends of the casing being greater than the external diameter of the outer ends of the tubular members and the internal diameter of the central part of the casing being greater than the external diameters of the enlarged inner ends of the tubular members, whereby relative movement of said tubular members out of alinement is permitted, and co-operating means on the enlarged ends of the tubular members to prevent relative rotation of each of the same with respect to the other, said means comprising co-operating recesses and projections on the enlarged ends forming shoulders adapted to engage to prevent such rotation.

In testimony whereof I have hereunto set my hand this 23rd day of April, 1927.

ROBERT L. LITTLE.